United States Patent [19]

Reitan

[11] 4,095,931
[45] Jun. 20, 1978

[54] INJECTION MOLDING MACHINE AND METHOD

[75] Inventor: David M. Reitan, Union Lake, Mich.

[73] Assignee: Incoe Corporation, Troy, Mich.

[21] Appl. No.: 636,367

[22] Filed: Dec. 1, 1975

[51] Int. Cl.$^2$ .............................................. B29F 1/03
[52] U.S. Cl. ................................... 425/564; 425/549; 425/567; 425/572; 251/319
[58] Field of Search .................. 425/243, 244, 245 R, 425/DIG. 224, 146, 564, 562, 566, 548, 549, 570, 567, 577, 569, 150, 166, 572, 588; 18/30 N; 251/319, 251

[56] References Cited

U.S. PATENT DOCUMENTS

| 2,770,011 | 11/1956 | Kelly | 425/245 R |
|---|---|---|---|
| 2,828,507 | 4/1958 | Strauss | 425/566 X |
| 2,871,517 | 2/1959 | Allard | 425/570 |
| 3,070,126 | 12/1962 | Schneider | 425/DIG. 224 |
| 3,372,433 | 3/1968 | Nonel | 425/146 X |
| 3,488,810 | 1/1970 | Gellert | 425/245 |
| 3,491,408 | 1/1970 | Natkins | 425/244 |
| 3,503,095 | 3/1970 | Uhlig | 425/577 |
| 3,767,340 | 10/1973 | Driscoll et al. | 425/146 |
| 3,847,525 | 11/1974 | Bielfeldt et al. | 425/245 R |
| 3,909,169 | 9/1975 | Barrie | 425/150 X |
| 3,924,811 | 12/1975 | Lynex et al. | 425/146 X |
| 3,941,540 | 3/1976 | Driscoll et al. | 425/243 |
| 3,954,209 | 5/1976 | Ramond | 425/146 X |

FOREIGN PATENT DOCUMENTS

2,061,267  6/1972  Germany ............................. 425/244

Primary Examiner—Francis S. Husar
Assistant Examiner—William R. Briggs
Attorney, Agent, or Firm—Harness, Dickey & Pierce

[57] ABSTRACT

A machine and method for injecting structural foam or other thermoplastic materials into one or more mold cavities. The machine comprises at least one mold-mounted shut-off bushing having a material delivery chamber formed between an outer body and a shank, with a shut-off pin slidably mounted in the shank, a heater being disposed between the pin and shank so as to heat the material passage as well as the shut-off pin tip. Closing of the shut-off bushings is independent of material pressures and is carried out from the space between a mold half and its platen by a cylinder operated cam rod.

12 Claims, 7 Drawing Figures

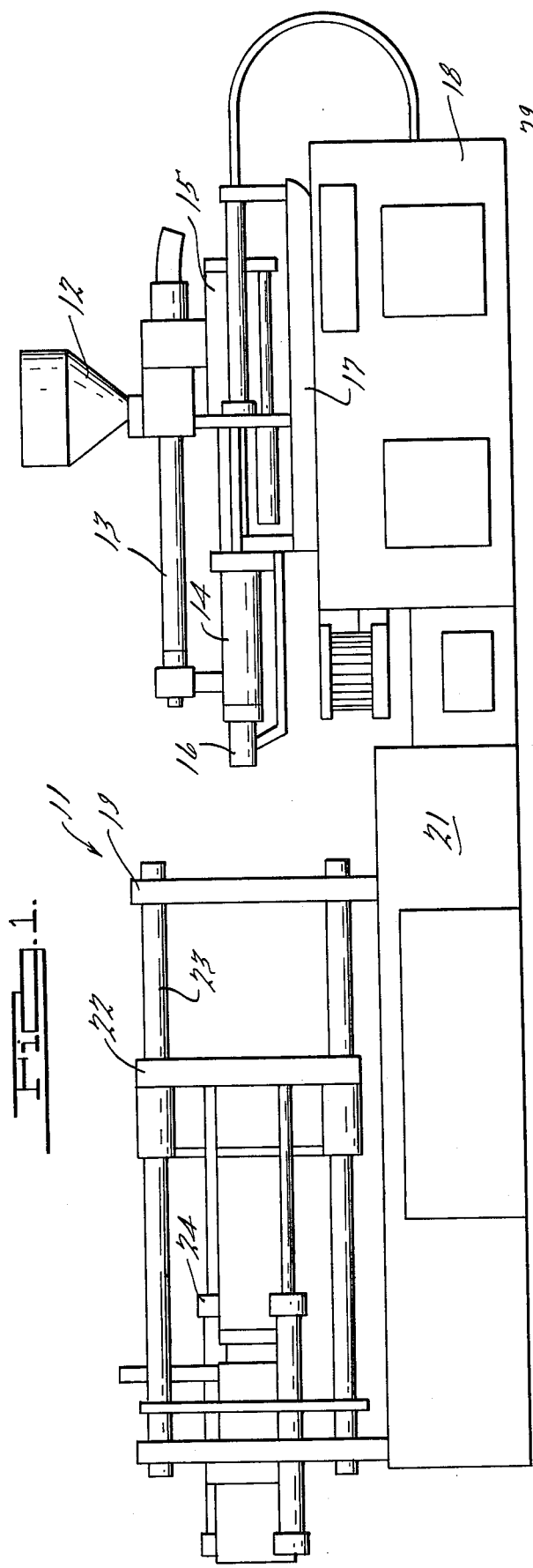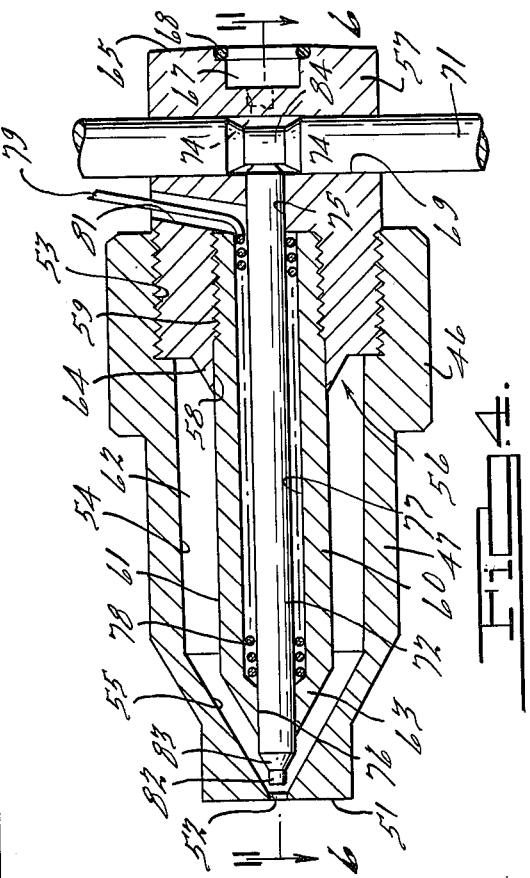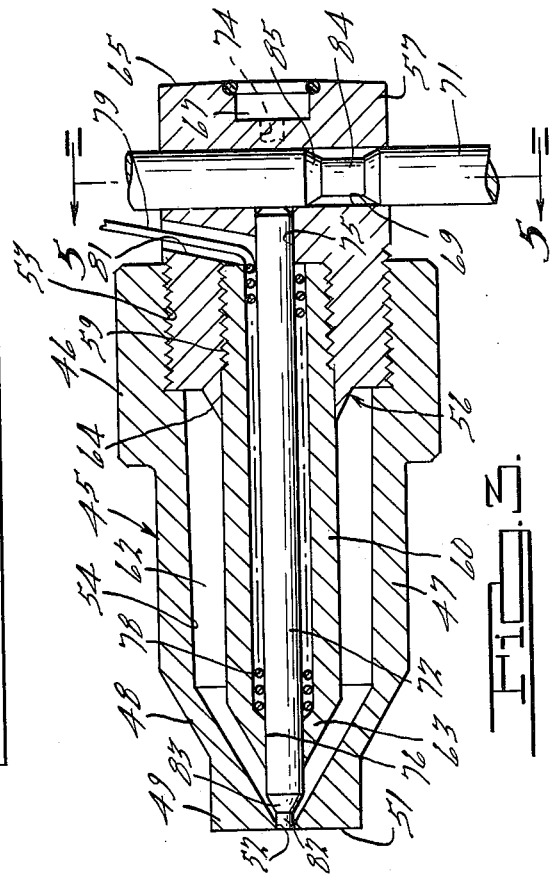

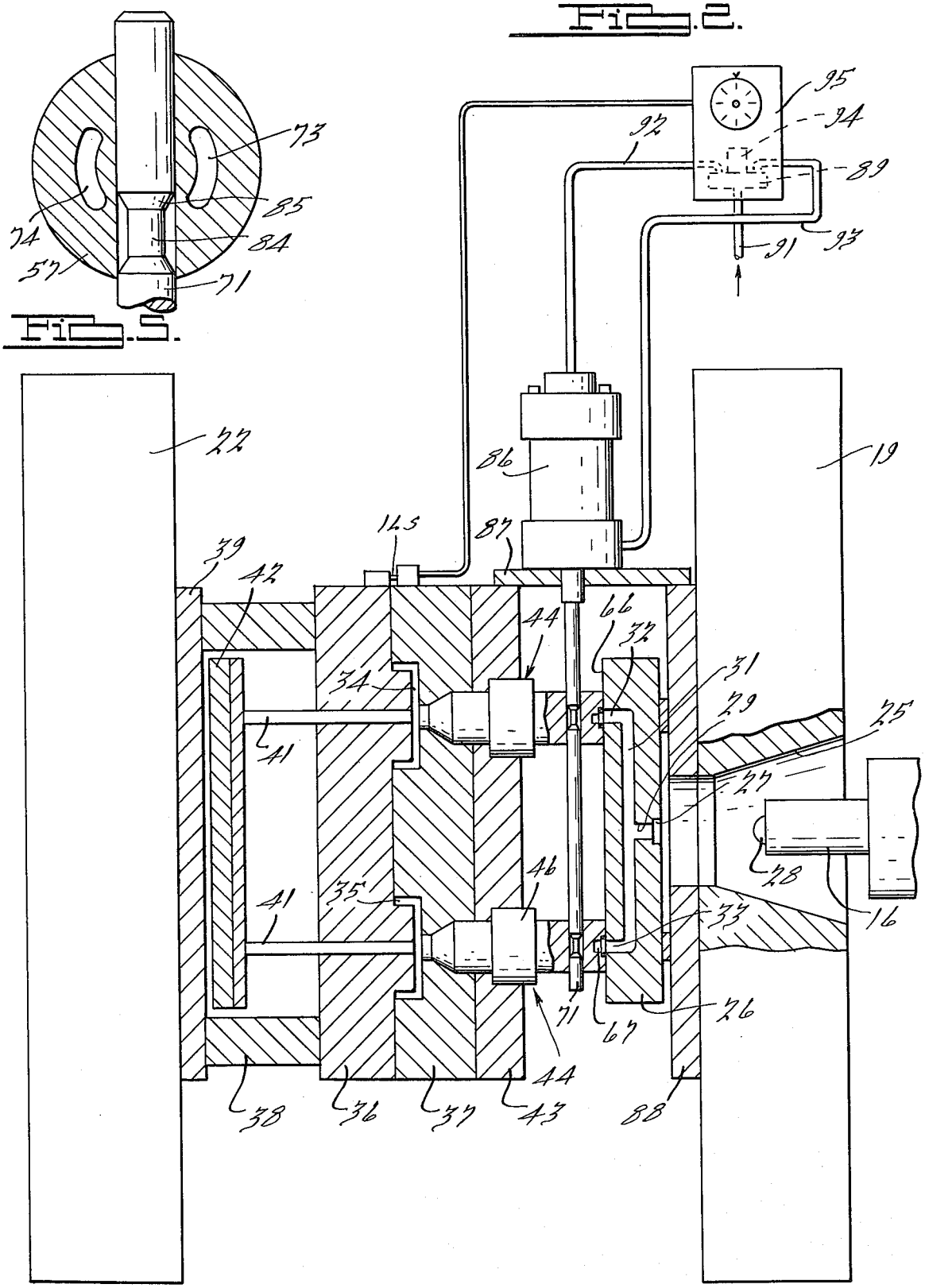

INJECTION MOLDING MACHINE AND METHOD

BACKGROUND OF THE INVENTION

1. Field of the Invention

This invention relates to machines and methods for injection molding of parts using thermoplastic materials. It is intended primarily for use with structural foam and foaming additives, with or without an accumulator which stores the plastic material under pressure. However, it may also be used with most other thermoplastic materials where positive shut-off is desirable.

2. Description of the Prior Art

Injection molding machines have two platens which support the mold halves. If a plurality of shut-off bushings are required, for example with plural cavities or a large cavity which must be filled simultaneously at spaced points, the bushings may be mounted either on one of the platens or one of the mold halves. If on the platens, sprues are formed which must be later removed. Furthermore, since the bushings are of fixed length and their locations permanent, the machine cannot be used with molds having different injection points.

Mold-mounted bushings on the other hand are removeable with the mold and the machine is thus usable to mold different parts. However, for high pressure structural foam molding it has heretofore been feasible to use only expensive structural foam type machines, not less costly standard injection machines. This has been due at least in part to the inability to operate shut-off bushings in the confined space within the mold.

Gilmore Pat. No. 3,010,155 discloses an internally heated nozzle to maintain the plastic at the discharge end in a softened condition so as to avoid "freezing off" in the nozzle end which could be caused by coolant in the mold. The construction in this patent has a number of disadvantages as compared with the present invention, including the fact that there is no means for directly and positively shutting off the plastic flow at the nozzle tip when desired.

Driscoll et al U.S. Pat. No. 3,767,340 shows a mold sprue bushing which also has an internal heating element and discloses a slidable tip valve spring-urged towards its closed position. There is no means for positively controlling the shut-off independently of material pressure. This makes it difficult if not impossible to control the density of the molded product by varying the time that the nozzle is open. Furthermore, the Driscoll construction could result in shearing or degrading of the material due to molecular changes, caused by spring pressure which causes the material to be forced through a restricted orifice under high pressure as the springs initiate their shut-off action. These changes in the material could adversely affect the structural properties of the molded article in terms of strength, brittleness or color, especially where shear-sensitive materials, such as polycarbonates, are used.

BRIEF SUMMARY OF THE INVENTION

It is an object of the present invention to provide a novel and improved injection molding machined shut-off bushing which overcomes disadvantages of prior known constructions and maintains the plastic in a softened condition at the orifice leading to the mold cavity while still permitting direct positive shut-off of the orifice at a preselected time independently of material pressures and of the machine injection cycle.

It is another object to provide an improved injection molding machine of this nature which is adaptable for either single or multiple cavity use with multi-level injection points and has a simplified construction permitting simultaneous actuation of a plurality of shut-off bushings which may be controlled in time relation to the closing of the mold, the timing being either for simultaneous or individual bushing operation.

It is another object to provide a construction and method which enables standard molding machines to be used for structural foam molding with multiple gated molds and mold-mounted bushings, with only minor machine modifications and little or no post-molding operations.

Other objects, features and advantages of the invention will become apparent from the following description and claims.

Briefly, the invention comprises a shut-off bushing for an injection molding machine having a hollow outer body, a shank within said body, the facing surfaces of the body and shank forming a material passage, a relatively narrow delivery orifice leading from said material chamber, a shut-off pin slidably mounted in said shank and movable into closed position with respect to said orifice, a heater disposed between said pin and shank, and actuating means for moving said pin to its closed position independently of the pressure in said material pasage and at said orifice.

In another aspect, the invention comprises an injection molding machine having two platens, mold elements carried by said platens which together form at least one cavity, at least one shut-off bushing on one of said mold elements having an orifice at said cavity, and actuating means for said shut-off bushing disposed between said one mold element and its platen.

In still another aspect, the invention comprises a method for molding articles between two platen-carried multiple gate mold elements, comprising the steps of mounting a plurality of shut-off bushings on one of the mold elements, closing said mold elements to form one or more cavities, injecting material through said shut-off bushings into said cavities, and actuating said shut-off bushings to their closed positions independently of the material pressure.

BRIEF DESCRIPTION OF THE DRAWINGS

FIG. 1 is an elevational view of an injection molding machine utilizing the principles of this invention, parts being omitted for clarity;

FIG. 2 is a partially schematic and partially cross-sectional view showing the movable and stationary platens, the manifold, shut-off bushings and their actuating means;

FIG. 3 is a cross-sectional view of a shut-off bushing shown in its closed position;

FIG. 4 is a similar view showing the bushing in its open position;

FIG. 5 is a cross-sectional view taken along the line 5—5 of FIG. 3 and showing the material passages through the main shank body;

DESCRIPTION OF THE PREFERRED EMBODIMENT

Figure 6:
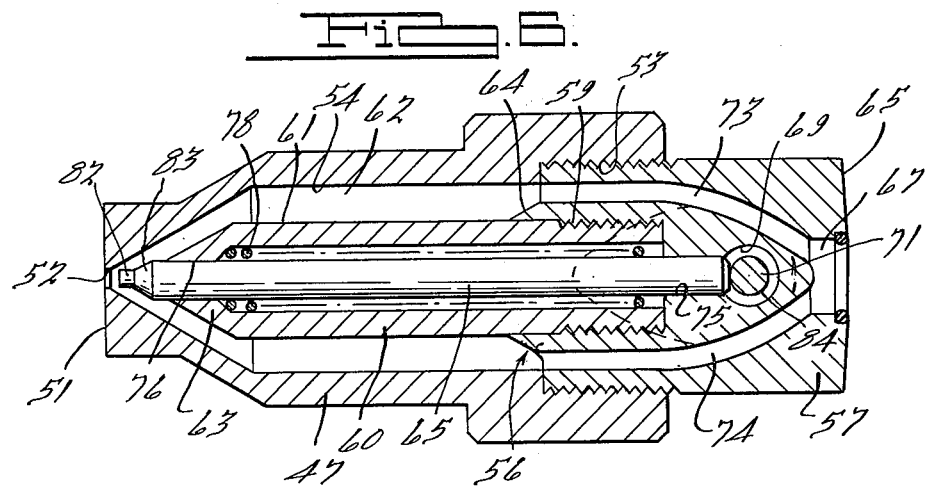
FIG. 6 is a cross-sectional view taken along the line 6—6 of FIG. 4 and further showing the material passages.

The molding machine is generally indicated at 11 and comprises a material hopper 12 from which material is delivered by a heated extruder 13 to a heated injection cylinder 14 operated by a reciprocable motor 15. An injection nozzle 16 leads from cylinder 14, components 14, 15 and 16 being mounted on a slidable carriage 17 carried by a base 18 of the machine. Base 18 may contain an accumulator unit (not shown) for storing plasticized plastic resin under pressure. Carriage 17 is advanced and retracted by means such as a hydraulic cylinder (not shown) within base 18 below the carriage. That some carriage movement will move injection nozzle 16 toward a stationary platen 19 carried by machine base portion 21 where it will engage the manifold described below. A movable platen 22 on guides 23 is slidable toward and away from stationary platen 19 by cylinders 24.

FIG. 2 shows the machine components disposed between platens 19 and 32 in partially schematic form. Stationary platen 19 is provided with an aperture 25 for reception of injection nozzle 16. A manifold 26 is secured to the side of platen 19 facing platen 22. This manifold has a seat 27 for receiving the rounded end 28 of injection nozzle 16, and a passage 29 leading from seat 27 to a cross passage 31. The cross passage leads to two passages 32 and 33 opening on the side of manifold 26 facing platen 22. It will be understood that this particular manifold construction is merely intended to be typical of what could be used according to the invention, the exact construction varying according to the number, shape and location of mold cavities.

In the illustrated embodiment of the invention, two mold cavities 34 and 35 are shown, being formed by the core half 36 and cavity half 37 of the mold. The core half is supported by movable platen 22 by means of support rails 38 and a clamp plate 39. Ejector pins 41 are slidably mounted in core mold half 36 and engage a stripper plate 42.

A cavity back-up plate 43 is provided for cavity mold half 37, and a pair of shut-off bushings generally indicated at 44 are mounted in clamp plate 43 and mold half 37. The shut-off bushings open on cavities 34 and 35, the portions of the bushings remote from the cavities being disposed between plate 43 and manifold 26 and aligned with manifold passages 32 and 33.

The construction of each shut-off bushing is seen in FIGS. 3 through 6. The bushing comprises an outer body generally indicated at 45 of elongated shape having a wider portion 46 supported by plate 43, a main cylindrical portion 47 supported by plate 43 and cavity mold half 37, and a tapered portion 48 leading to a cylindrical exit portion 49. This exit portion has a surface 51 which is contiguous with the adjacent mold cavity surface of mold cavity half 37, and has a central exit aperture or orifice 52 for the material being injected.

Body 45 is of hollow shape, having an interiorly threaded portion 53 within body portion 46, and a main inner surface 54 leading to a tapered surface 55. A shank generally indicated at 56 is carried by body 45. The shank comprises a main shank body 57 threadably mounted in portion 53 of the body and extending rearwardly therefrom. Shank portion 57 has a forwardly open threaded recess 58 which receives external threads 59 of a removable shank portion 60. Shank portion 60 extends toward aperture 52 and has a main cylindrical surface 61 spaced inwardly from surface 54 of body 45 to form an annular material passage 62. Shank portion 60 has a tapered section 63 forwardly of section 61 which is spaced inwardly from tapered surface portion 55 of the body.

Main shank body 57 has a tapered extension 64 surrounding removable shank portion 60 forwardly of its threads 59. Portion 64 acts as a seal to prevent leakage of the pressurized material. The rear surface 65 of shank portion 57 is engageable with a facing surface 66 of manifold 26. A receiving passage 67 is formed in shank portion 57 for material issuing from injection nozzle 16. A seal 68 carried by a recess in surface 65 prevents leakage of the material as it passes from the injection nozzle to the shut-off bushing.

A transverse bore 69 is formed in shank portion 57 between passage 67 and body 45. A cam rod 71 is slidably mounted in this bore and actuates a shut-off pin 72 as described below. A pair of material passages 73 and 74 (FIG. 6) lead from passage 67 around bore 69 to material passage 62 between the shank and body.

Shut-off pin 72 is slidably mounted in a bore 75 within shank portion 57 and a bore 76 within the tapered section 63 of shank portion 60, the latter section acting as a seal to prevent pressurized material from being forced between the pin and shank. The interior of shank portion 60 between its section 63 and its rearward end is enlarged so that a space 77 is formed. A coiled electrical heating element 78 is disposed in this space and is supplied by a lead 79 extending through a passage 81 in shank portion 57. Heating coil 78 is preferably constructed so as to contact the adjacent surfaces of both the pin and removable shank portion 60, so that heat will be conducted both to material chamber 62 and to the forward end of the pin. This forward end 82 is of complementary shape to orifice 52 and is connected to the main portion of the pin by a tapered section 83.

Cam rod 71 is provided with a pair of reduced diameter portions 84 which are joined to the main rod portions by frustoconical portions 85. In the rod position shown in FIG. 4, reduced portions 84 are aligned with pins 72 so that the pressure of material acting on the areas 83 of the pins will force them rightwardly from their FIG. 3 to their FIG. 4 position. This will open orifices 52 and permit the pressurized plastic material to be injected into mold cavities 34 and 35. Downward movement of rod 71 from its FIG. 4 position will cause the pins 65 to be shifted leftwardly until their portions 82 enter orifices 52. Such movement will rapidly and completely shut off the flow of plastic material to the mold cavities. Shut-off will take place in a positive manner without any shearing or degrading of the material due to restricted flow.

The illustrated means for shifting rod 71 between its positions comprises a double-acting reciprocable fluid motor 86 mounted on de-energized support 87 extending between platen 19 and cavity back-up plate 43. More particularly, a clamp plate 88 is disposed between platen 19 and manifold 26, one end of support 87 resting on plate 43 and the other on plate 88. Motor 86 is controlled by means such as a four-way valve shown schematically at 89. Valve 89 is provided with a fluid supply conduit 91 and a pair of conduits 92 and 93 leading to the opposite sides of motor 86. The position of the valve is controlled by a solenoid 94 so that, for example, with the solenoid d-energized cam rod 71 is in its FIG. 3 position to close bushings 44, and with the solenoid energized the cam rod will move to its FIG. 4 position permitting pins 72 to open orifices 52.

Figure 7:
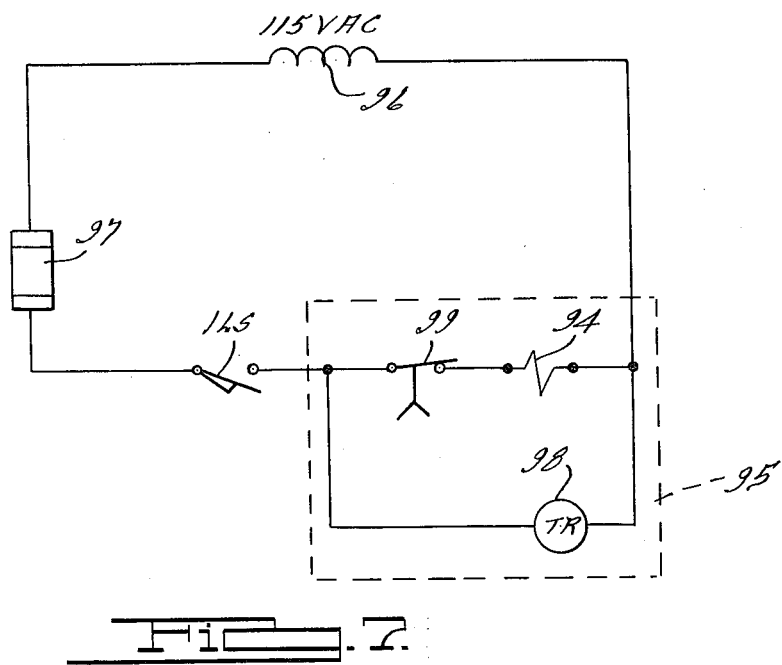
FIG. 7 is an electrical circuit diagram showing a limit switch and timing relay circuit.

The energization and de-energization of solenoid 94 is shown as being controlled by a timer 95 controlled by a limit switch 1LS. This limit switch is normally open as seen in FIG. 7 and is closed when the halves of the mold come together. FIG. 7 shows a circuit diagram indicating a source of supply 96 and a fuse 97 in series with limit switch 1LS. A timing relay 98 is connected in series with limit switch 1LS, a parallel circuit with the timing relay having a timing relay switch 99 and solenoid 94. The arrangement is such that switch 99 will close and solenoid 94 will be energized immediately upon closure of LS1, thus opening the shut-off bushings. Timer 95 will control the closing of the shut-off bushings, and therefore the period of injection. This is accomplished by timing relay 98 which will open switch 99 after a preset period. Alternatively, solenoid 94 may be energized a very short period of time after 1LS closes, utilizing additional timing means (not shown), in order to achieve a desired pressure buildup before the mold cavities are charged. Still another timer (not shown) on the machine may determine the cooling time for the parts in the molds.

It should be observed that while the illustrated embodiment of the invention shows a single cam rod controlled by one reciprocable motor which is in turn controlled by a single timer, it is contemplated within the principles of the invention to have a plurality of cam rods for individual shut-off bushings, these rods being actuated by individual reciprocable motors and, if desired, controlled by separate timers. The reciprocating motor or motors may of course be actuated by hydraulic or air pressure.

In operation, injection nozzle 16 will initially be in engagement with port 27 of manifold 26, and cam rod 71 will be in its FIG. 3 position, with pins 65 closing orifices 52 of the shut-off bushings. Platens 19 and 22 will be brought together to form the mold cavities by the interfitting of mold halves 36 and 37.

Limit switch 1LS will be actuated by closing of the mold halves, energizing timing relay 1TR. This will cause shifting of motor 86, permitting pins 72 of the shut-off bushings to be retracted by the material pressure, thus opening orifices 52 and permitting the pressurized material to fill the mold cavities. Timer 95 will control the open time of the shut-off bushings, this time being chosen so as to get the desirable part quality.

After timer 95 times out, shut-off bushings 44 will be returned to their FIG. 3 position, regardless of material pressure. The shut-off bushings will remain closed until the machine is re-cycled, automatically re-setting timer 95 for the next cycle. The mold parts will be cooled for a timed interval and the mold then opened, re-setting the timer. Opening of the mold will cause the molded parts to be ejected therefrom. When the mold is opened, the open switch 1LS will prevent operation of shut-off bushings 44; opening of switch 1LS will also reset the shut-off timer 95.

It should be observed that heater coil 78 will maintain the plastic material in space 62 as well as at orifice 62 in molten condition at all times, thus preventing problems which may arise if the material cools. Even though a mold may be cooled typically to about 40° F. to permit the parts to soldify, heater coil 78 will maintain the plastic at orifice 52 in fluid condition, perhaps at a 400° F. temperature. The close contact between heater 78 and pin 72 as well as forward shank section 63 will cause heat to be conducted to the very tip of 82 of the pin. It has been found that the above-described heater arrangement also permits a layer of cooled and hardened plastic to be formed immediately inside surface 54, an arrangement which achieves beneficial results. This layer of plastic will serve to heat-insulate the mold from the material in the bushing.

The ability to positively open and close the shut-off bushings at any time during the machine ejection cycle makes it possible to control the density of the molded product by varying the time shut-off bushings 44 are open. The positive control means that shut-off of the flow of plastic material may be at any time, even under very high material pressure.

The invention makes it possible to carry out structural foam molding with multiple gated molds on standard injection molding machines after making at the most only minor and relatively inexpensive machine modifications. A standard machine could be adapted for high pressure structural foam operation by adding an accumulator which stores the plasticized plastic under pressure. The same machine can be used for molding various parts having cavity surfaces with different contours, surface levels and injection points, merely by replacing the mold halves together with their shut-off bushings. The novel shut-off bushing actuator construction makes it possible to control the bushings regardless of their number and location. In all cases there will be no sprues, even for multi-level parts, and therefore a minimum of post-molding operations.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. A shut-off bushing for an injection molding machine comprising an elongated hollow outer body having a central axis, a shank within and fixed to said body, the facing surfaces of the body and shank forming an axially uninterrupted material passage, a relatively narrow delivery orifice formed in one end of said body by radially inwardly extending portions thereof and leading from said material passage, said one end of the body being immovable with respect to the remainder of the body, a shut-off pin slidably mounted in said shank and movable into closed position with respect to said orifice, said pin being at all times in non-obstructing relation with said material passage, heating means disposed inwardly of said material passage and in thermally conductive relation with said shank and said pin, and actuating means connected to said pin for moving said pin to its closed position independently of the pressure in said material passage and at said orifice.

2. A shut-off bushing according to claim 1, said shank comprising a main shank body secured to said outer body at the end remote from said orifice and a removable shank portion attached to said main shank body.

3. A shut-off bushing according to claim 2, further provided with a seal between said removable shank portion and said pin adjacent said orifice, and a second seal between said removable shank portion in said main shank body remote from said orifice.

4. A shut-off bushing according to claim 1, said pin actuating means comprising a cam movably mounted at the end of said bushing remote from said orifice, the end of said pin engaging said cam.

5. A shut-off bushing according to claim 1, said outer body and shank being tapered inwardly toward said orifice, said pin having a forward portion receivable by said orifice and a tapered portion leading from said forward portion to the main portion of said pin.

6. A shut-off bushing according to claim 1, said pin extending through said shank, said actuating means comprising a shut-off cam slidably mounted in said shank at the end remote from said orifice and engageable with said pin.

7. A shut-off bushing according to claim 1, said shank extending rearwardly of said outer body and having a material passage leading to the material passage between said shank and outer body, said means for controlling said pin comprising a cam rod slidable in said shank adjacent said material passage and having a portion of reduced diameter and at least one frustoconical portion.

8. A shut-off bushing according to claim 1, further provided with motor means disposed laterally of said pin and connected to said pin actuating means.

9. A shut-off bushing according to claim 8, said pin actuating means comprising a cam rod slidably mounted for movement transversely to the extent of said pin.

10. A shut-off bushing according to claim 1, said shank having a forward section in close relation with said pin, said heater being in contact with said forward shank section.

11. A shut-off bushing for an injection molding machine comprising an elongated hollow outer body having a central axis, a shank within and fixed to said body, facing surfaces on the body and shank forming an axially uninterrupted material passage, a relatively narrow delivery orifice formed in one end of said body by radially inwardly extending portions thereof and leading from said material passage, a shut-off pin slidably mounted in said shank and movable into closed position with respect to said orifice, said pin being at all times in non-obstructing relation with said material passage, heating means disposed inwardly of said material passage and in thermally conductive relation with said shank, said heating means comprising a coil in contact with said pin and the interior surface of said shank, and actuating means connected to said pin for moving said pin to its closed position independently of the pressure in said material passage and said orifice.

12. An injection molding machine comprising two platens, a mold element carried by each of said platens, said mold elements forming at least one cavity, at least one shut-off bushing supported on one of said mold elements, said shut-off bushing having an orifice communicating with said cavity, actuating means for said shut-off bushing disposed between said one mold element and its platen, there being a plurality of shut-off bushings supported on said one mold element and a manifold supported between said shut-off bushings and the platent for said one mold element, said manifold having a platen for receiving material and passages leading from said port to said shut-off bushings, said actuating means being for said plurality of shut-off bushings and being disposed between said manifold and said one mold element, each said shut-off bushing having a slidably mounted pin moved by said actuating means to close said orifice, said actuating means comprising a cam rod slidably mounted for movement transversely to the extent of said pins, and a reciprocable motor moving said cam rod.

* * * * *

UNITED STATES PATENT AND TRADEMARK OFFICE
CERTIFICATE OF CORRECTION

PATENT NO. : 4,095,931
DATED : June 20, 1978
INVENTOR(S) : David M. Reitan

It is certified that error appears in the above-identified patent and that said Letters Patent are hereby corrected as shown below:

Column 2, line 6, "time" should be --timed--;

Column 3, line 15, "some" should be --same--;

Column 3, line 22, "32" should be --22--;

Column 4, line 57, "de-energized" should be --a--;

Column 8, line 23, "platent" should be --platen--;

Column 8, line 24, "platen" should be --port--.

Signed and Sealed this

Nineteenth Day of December 1978

[SEAL]

Attest:

RUTH C. MASON
Attesting Officer

DONALD W. BANNER
Commissioner of Patents and Trademarks